United States Patent [19]

Schon

[11] Patent Number: 5,081,736
[45] Date of Patent: Jan. 21, 1992

[54] STREAMLINED WINDSHIELD WIPER WITH SHOCK ABSORBER

[75] Inventor: Monsieur W. Schon, Saint-Etienne/Usson, France

[73] Assignee: Valeo Systemes d'Essuyage, Montigny-Le-Bretonneux, France

[21] Appl. No.: 641,859

[22] Filed: Jan. 16, 1991

[30] Foreign Application Priority Data

Jan. 17, 1990 [FR] France .................................. 90 00481

[51] Int. Cl.⁵ .............................................. B60S 1/32
[52] U.S. Cl. .............................. 15/250.35; 15/250.19; 15/250.00 R
[58] Field of Search ................... 15/250.19, 250.00 R, 15/250.35, 250.42, 250.16, 250.20, 250.36

[56] References Cited

U.S. PATENT DOCUMENTS

| | | | |
|---|---|---|---|
| 2,246,740 | 6/1941 | Lethbridge | 15/250.19 |
| 2,717,408 | 9/1955 | Le Page | 15/250.19 |
| 2,979,750 | 4/1961 | Anderson | 15/250.00 R |
| 3,263,261 | 8/1966 | Schulz | 15/250.35 |
| 4,046,141 | 8/1977 | O'Steer | 15/250.19 |
| 4,561,143 | 12/1985 | Beneteau | 15/250.42 |
| 4,663,797 | 5/1987 | Miller | 15/250.19 |

FOREIGN PATENT DOCUMENTS

| | | | |
|---|---|---|---|
| 3226258 | 1/1984 | Fed. Rep. of Germany | 15/250.19 |
| 100035 | 6/1984 | Japan | 15/250.19 |
| 61697 | 6/1978 | U.S.S.R. | 15/250.19 |
| 872623 | 7/1961 | United Kingdom | 15/250.20 |

Primary Examiner—Harvey C. Hornsby
Assistant Examiner—Gary Graham
Attorney, Agent, or Firm—Dennison, Meserole, Pollack & Scheiner

[57] ABSTRACT

A streamlined windshield wiper consists, in general, of a windshield wiper blade for wiping a glazed surface, a windshield wiper arm carrying the blade, and a streamlining cowl carried at least on the arm. Shock absorbing means are provided between the wipers and the swept surface.

9 Claims, 3 Drawing Sheets 5,081,736

STREAMLINED WINDSHIELD WIPER WITH SHOCK ABSORBER

FIELD OF THE INVENTION

This invention relates to streamlined windshield wipers, in particular for automotive vehicles.

BACKGROUND OF THE INVENTION

Such a windshield wiper commonly consists of a windshield wiper blade which comprises a mounting means carrying a wiping strip which sweeps against a glazed surface in direct contact with the latter, the glazed surface (or swept surface) being for example a windshield or rear window of an automotive vehicle. The wiper blade is typically carried by a windshield wiper arm, which is arranged to be driven in alternating rotational movement by a driving spindle which is fixed on to the bodywork of the vehicle.

For aesthetic and aerodynamic reasons, it is arranged that at least the windshield wiper arm is enclosed at least partly by a cowling or streamlining element. More particularly, this cowling, having the general cross sectional shape of an inverted U-shaped channel, is secured to the windshield wiper arm in such a way that the wing portions of the U-shaped channel will be directed towards the swept surface, thus masking the windshield wiper arm. By virtue of this streamlining means, it is possible to confer on the windshield wiper a generally pleasing appearance, while also giving it an aerodynamic function such that any air flow that may penetrate into the free space existing between the swept surface and the wiper itself will be deflected away from this space, thus avoiding impairment of good operation of the wiper.

Certain drawbacks have however been encountered, in particular when the general shape of the arm is not straight, and more especially where the arm is in two portions, each of which is substantially rectilinear, but which define between them an angle greater than zero and constituting an elbow at the intersection of the two straight portions. In that arrangement, the streamlining element carried by the arm extends in the same general direction as that of the arm, being again provided with an elbow.

Thus, during a mechanical operation on the windshield wiper, for example changing the wiper blade, or during manual wiping of the glass, it is necessary to place the wiper in a disengaged position. In order to reach this position, the end of the windshield wiper arm, carried by a pivot axis which is provided on the driving head that is coupled with the driving spindle, pivots (in known manner) with respect to the driving spindle, in such a way as to space its other end, i.e. the end carrying the windshield wiper blade, away from the swept surface in a movement which is substantially perpendicular to the latter. The disengaged position is that which is reached at the end of this movement, in which the windshield wiper itself remains in a position spaced away from the swept surface.

After carrying out an operation on the wiper, or after manual wiping of the swept surface, the operator generally pushes the windshield wiper back in the reverse direction, without shifting it manually in such a way as to place the wiper in an operating position in which the blade, and more particularly its wiping strip, is actually in contact with the swept surface.

During contact of the windshield wiper blade on the swept surface, and because of the kinetic energy generated by the pivoting movement of the assembly of the arm (with its blade and streamlining element) about the pivot axis, the junction zones or elbows between the two straight portions of the arm and those of the streamlining element continue their movements towards the swept surface until they collide with it. The end of the arm carrying the blade then becomes fixed by engagement of the blade on the glazed swept surface.

Similarly, when the windshield wiper is carried by the rear tailgate of an automotive vehicle, the impact mentioned above can also take place while the tailgate is being closed sharply on its hinges, particularly when it is being slammed.

This impact on the swept surface not only produces a disagreeable noise, but can lead to damage, either to the streamlining element or to the glazed surface, thus detracting from good visibility by the driver.

DISCUSSION OF THE INVENTION

An object of the present invention is to overcome the drawbacks mentioned above, while providing a windshield wiper which is very simple and economical in design.

In accordance with the invention, a streamlined windshield wiper, in particular for an automotive vehicle, comprising a windshield wiper blade for sweeping a glazed surface, a windshield wiper arm carrying the said blade, and a streamlining element or cowl carried at least by the said arm, is characterised in that shock absorbing means are provided between the streamlined windshield wiper and the swept surface.

By virtue of the shock absorbing means, in the event of any impact between the streamlined windshield wiper and the glazed swept surface, both the latter and the streamlining cowl are protected.

According to another feature of the invention, the shock absorbing means are carried by the windshield wiper arm.

According to a further feature of the invention, the shock absorbing means are carried by the cowl.

The other features and advantages of the invention will appear from the description which follows, which is given by way of example only and with reference to the accompanying drawings.

DESCRIPTION OF A PREFERED EMBODIMENT OF THE INVENTION

Figure 1:
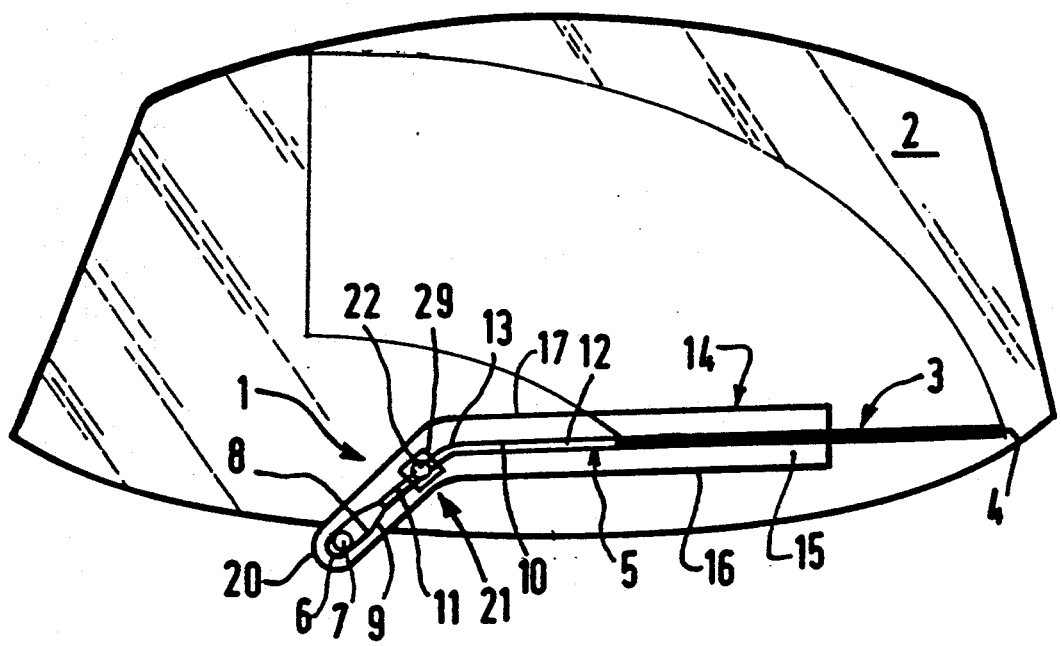
FIG. 1 is a general, diagrammatic, view of the streamlined windshield wiper in accordance with the invention, seen, through the surface which is to be swept, by an observer inside the vehicle.
Figure 2:
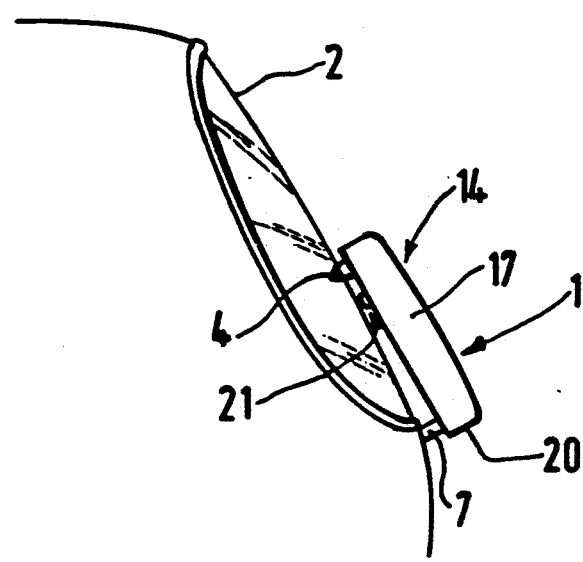
FIG. 2 is a diagrammatic outside view as seen from the right hand side of FIG. 1.

Reference is first made to FIGS. 1 and 2, which show a streamlined windshield wiper 1 for sweeping a glazed surface 2. The streamlined windshield wiper 1 comprises a windshield wiper blade 3, which includes a mounting (not shown) which carries a windshield wiper blade wiping strip 4, for wiping the surface 2 when in direct contact with the latter. The blade 3 is carried by a windshield wiper arm 5 which is arranged to be driven in alternating rotational movement by a driving head 6 which is coupled to a driving spindle 7. The spindle 7 is in its turn carried by fixed parts of the automotive vehicle.

In a manner which is already known, the driving head 6 carries a pivot axis 8 which is orthogonal to the driving axis 7 and substantially parallel to the swept surface 2. The pivot axis 8 is coupled to a hood 9 carrying the shank 10 of the arm 5, so that the arm can be driven in angular displacement. The driving head 6, the hood 9 and the shank 10 are the main components of the windshield wiper arm. Also as is already known, that end of the shank 10 which is opposed to the end which is joined to the hood 9 is so shaped that it can carry the windshield wiper blade 3 in an articulated manner.

As is best seen in FIG. 1, the windshield wiper arm is generally not straight. More precisely, the shank 10 has a first portion 11 and a second portion 12, each of which is substantially rectilinear, but which are joined together in a junction zone 13 or elbow, so that the two rectilinear portions 11 and 12 define between them an angle which is greater than zero but smaller than 180°.

Figure 3:
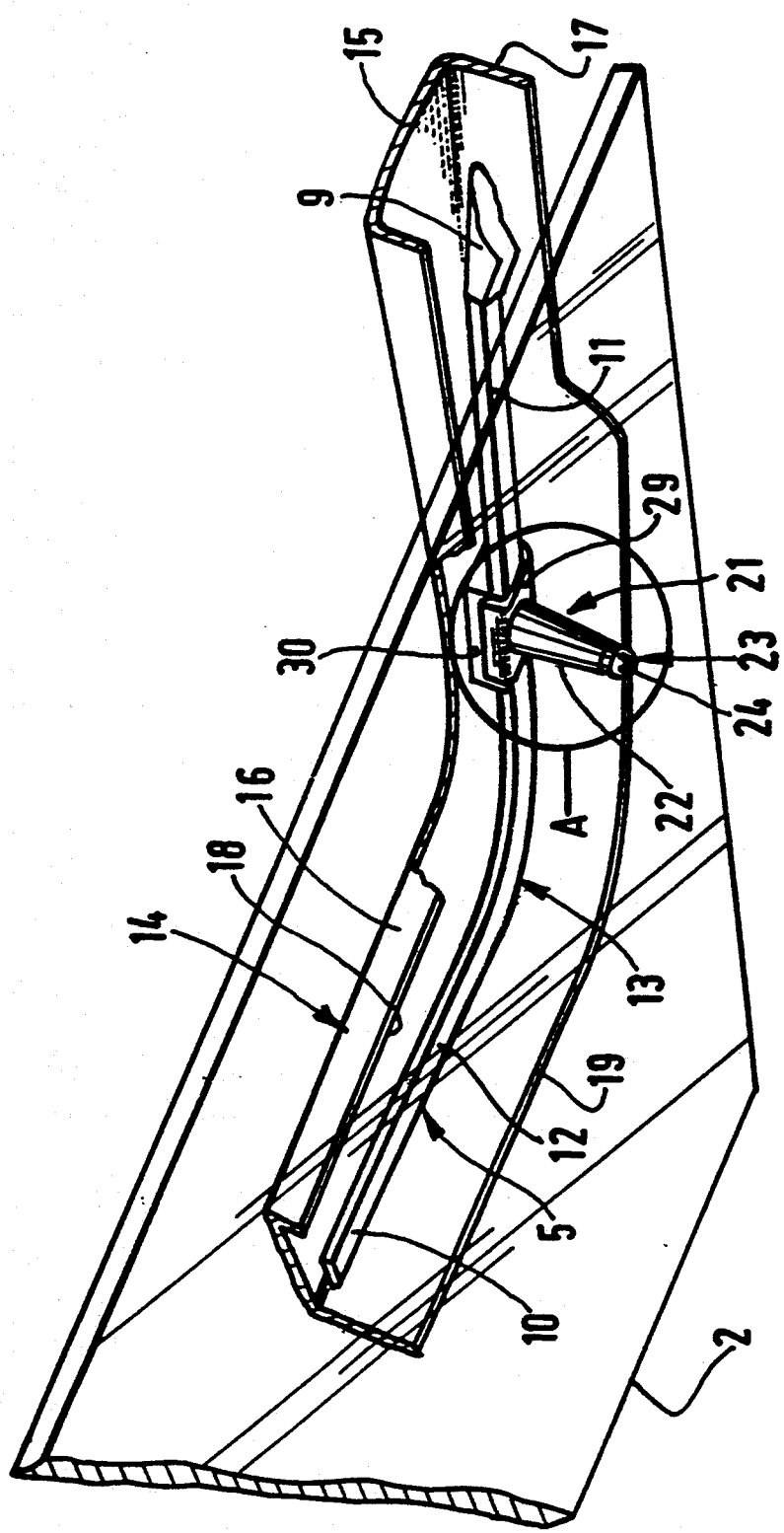
FIG. 3 is a partial perspective view of the windshield wiper in accordance with the invention.

Referring now also to FIG. 3, the arm 5 is arranged to carry a cowl or streamlining element 14. The cowl 14 has a cross section which is generally in the form of an inverted U-shaped channel, having a base 15 the inner surface of which bears on the windshield wiper arm. The wing portions 16 and 17 of the channel are directed towards the swept surface 2, in such a way that the free edges 18 and 19 of the wing portions are spaced away from the swept surface.

As is shown in the drawings, the longitudinal shape of the cowl 14 is generally similar to the general longitudinal shape of the arm 5, and also includes an elbow: more precisely, the U-shaped channel is open at that one of its ends that lies at the level of the windshield wiper blade 3, while the end of the cowl which is located at the level of the driving spindle is formed with a wall portion 20 which is substantially circular. In practice, the wing portions 16 and 17 of the cowl are of different depths.

Shock absorbing means 21 are provided between the windshield wiper 1 and the swept surface 2. The shock absorbing means are carried either by the windshield wiper arm 5 or by the cowl 14, and are arranged in the vicinity of the elbow 13.

Figure 4:
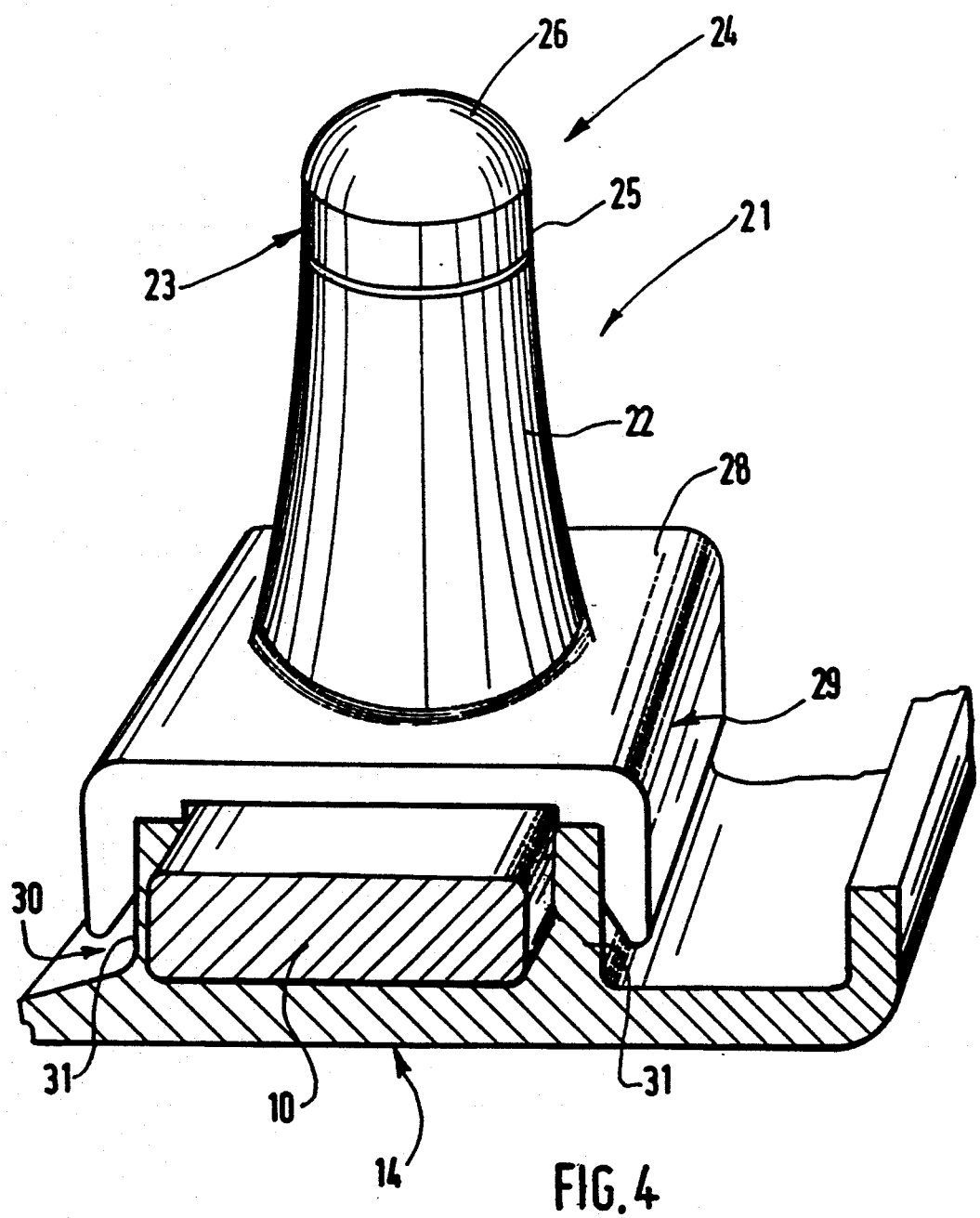
FIG. 4 is a perspective view, on a larger scale, of the detail A in FIG. 3.

In practice, and as is best seen in FIG. 3, the shock absorbing means comprise at least one projecting element 22 which is directed towards the swept surface 2. The free end 23 of the shock absorbing element 21 is spaced away from the swept surface 2, but the length of the element 22 is great enough to exceed the greatest depth of the wing portions of the cowl 14. Preferably, and as is shown in FIG. 4, the free end of the projecting element 22 is in the form of a resiliently deformable portion 24 which constitutes a resilient pad. The resiliently deformable portion 24 may be carried on the projecting element 22 by any suitable known means, for example by being soldered, adhesively secured or clipped in position. The pad 24 has a first cylindrical portion 25 which is continued in a demi-hemispherical portion 26, such that, in the event of any possible contact between the pad 24 and the swept surface 2, this takes the form of point contact.

In practice, the projecting element 22 has (by way of example) a frusto-conical form, the narrower end of which carries the pad 24, with its wider end being coplanar with the outer surface 28 of a base 29 which thus carries the projecting element and the pad. The base 29 is arranged to be carried by the streamlined windshield wiper 1. More precisely, the base 29 is carried by a pedestal element 30 which projects from the base 15 of the channel of the cowl 14.

Referring now in particular to FIG. 4, it should be noted that the pedestal element 30 consists of two wing portions 31 which are spaced apart by a distance which is sufficiently large to allow the shank 10 of the windshield wiper arm to be inserted between the two wing portions 31; and that the base 29 overlies the wing portions 31 and the arm shank 10, thus securing the shank, the cowl and the projecting element 22 together. However, the pedestal element 30 and the base 29 may be secured together in any known manner, and the pedestal element is preferably welded ultrasonically, for example, to the base 29. Further, and without departing from the general scope of the invention, the pedestal element and the base may alternatively of course be secured together by a suitable clipping arrangement.

The invention is not limited to the embodiment described. For example, the projecting element 22 and the resiliently deformable portion 24 may be formed integrally with each other in the same resiliently deformable material.

Again, it can be conceived that the projecting element 22 may extend directly either from the base 15 of the cowl, or from one of the free edges 18, 19 of its wing portions 16 and 17.

What is claimed is:

1. A windshield wiper assembly comprising a windshield wiper arm (5) pivotally connected at one end to a driving spindle (7) for oscillatory motion over a swept surface, said pivotal connection including a spring force urging said wiper arm against said swept surface, a windshield wiper blade (3) connected to said wiper arm at an end remote from said one end, a streamlined cowl (14) having a top (15) and sides (16, 17) embracing said wiper arm said cowl sides extending towards said swept surface but spaced therefrom; and a shock absorbing means (21) projecting from said cowl towards said swept surface but terminating at a location below said cowl sides but above said swept surface such that said shock absorbing means cushions the blow when said wiper assembly strikes said swept surface under urging of said pivot means spring force after being manually rocked around said pivot to a service position spaced from said swept surface and wherein said wiper arm comprises a first linear section (11) and a second linear section (12) joined by a curved zone (13), said linear sections forming an included angle less that 180 degrees; and said shock absorbing means projecting from said cowl in the neighborhood of said curved zone.

2. A windshield wiper assembly according to claim 1, wherein the shock absorbing means are carried by the wiper arm.

3. A windshield assembly according to claim 1, wherein the shock absorbing means are carried by the cowl.

4. A wiper according to claim 1, wherein the shock absorbing means comprise a projecting element which is directed towards the swept surface, the said projecting element being of such a length as to be normally spaced away from the latter.

5. A wiper according to claim 4, wherein the said projecting element has a free end comprising a resiliently deformable portion directed towards the swept surface.

6. A wiper according to claim 4, further including a base carrying the said projecting portion.

7. A wiper according to claim 6, further including a pedestal element projecting from the cowl, for cooperation with the said base.

8. A wiper according to claim 7, wherein the said base is secured to the said pedestal element.

9. A wiper according to claim 7, wherein the said base and pedestal element are arranged on either side of the wiper arm so as to secure the cowl with respect to the wiper arm.

* * * * *